United States Patent
Pei

(10) Patent No.: US 10,619,788 B2
(45) Date of Patent: Apr. 14, 2020

(54) ADJUSTABLE TELEVISION FIXING BRACKET

(71) Applicant: Xuan Pei, Shenzhen OT (CN)

(72) Inventor: Xubo Pei, Guangdong (CN)

(73) Assignee: Xuan Pei, Shenzhen (CN)

( * ) Notice: Subject to any disclaimer, the term of this patent is extended or adjusted under 35 U.S.C. 154(b) by 0 days.

(21) Appl. No.: 16/036,576

(22) Filed: Jul. 16, 2018

(65) Prior Publication Data
US 2019/0203873 A1 Jul. 4, 2019

(51) Int. Cl.
*F16M 11/12* (2006.01)
*F16M 11/10* (2006.01)
*A47B 81/06* (2006.01)
*F16M 11/04* (2006.01)

(52) U.S. Cl.
CPC ......... *F16M 11/105* (2013.01); *A47B 81/061* (2013.01); *F16M 11/041* (2013.01); *F16M 11/12* (2013.01); *F16M 11/126* (2013.01); *F16M 2200/022* (2013.01)

(58) Field of Classification Search
CPC .. F16M 11/105; F16M 11/041; F16M 11/126; F16M 2200/022; A47B 81/061
USPC .... 248/917–923, 276.1, 287.1, 286.1, 278.1, 248/274.1
See application file for complete search history.

(56) References Cited

U.S. PATENT DOCUMENTS

| | | | | |
|---|---|---|---|---|
| 5,931,102 A * | 8/1999 | Grahl | .................. | A47B 17/033 108/143 |
| 6,581,890 B2 * | 6/2003 | Johnson | ................. | A45D 44/04 248/161 |
| 7,070,156 B2 * | 7/2006 | Liao | ................... | B60R 11/0235 248/225.21 |
| 7,334,766 B2 * | 2/2008 | Ligertwood | .......... | F16M 11/10 248/201 |
| 7,395,995 B2 * | 7/2008 | Chen | .................. | F16M 11/105 248/284.1 |
| 7,744,046 B1 * | 6/2010 | Lundy | .................... | B60R 11/02 248/121 |
| 7,823,850 B1 * | 11/2010 | Lam | ...................... | F16M 11/10 248/292.14 |
| 7,857,270 B2 * | 12/2010 | Short | ................ | F16M 11/2014 248/284.1 |

(Continued)

*Primary Examiner* — Nkeisha Smith
(74) *Attorney, Agent, or Firm* — Hauptman Ham, LLP

(57) ABSTRACT

The present disclosure provides an adjustable television fixing bracket comprising a mounting member, fixing strips, a connecting standpipe, a connecting horizontal pipe, a supporting standpipe and an adjusting pipe. The fixing strips engage with the mounting member to form a fixed structure. The mounting member is mounted to the connecting standpipe through an adjustable mechanism to form an adjustable structure which can tilt front and rear. The connecting standpipe is mounted to the connecting horizontal pipe to form a rotatable structure. The connecting horizontal pipe is mounted to the supporting standpipe to form a rotatable structure. The supporting standpipe is mounted to the adjusting pipe through a quick release structure. In present disclosure, the television can be tilted upwards, downwards, rotated left or right, and raised or lowered height according to the actual observation needs of users. The television is mounted in a quick-mounted structure, which is more convenient to operate.

17 Claims, 6 Drawing Sheets

(56) References Cited

U.S. PATENT DOCUMENTS

| | | | | |
|---|---|---|---|---|
| 7,871,048 B2* | 1/2011 | Sculler | F16M 13/02 | 248/214 |
| 8,162,271 B2* | 4/2012 | Li | F16M 11/105 | 248/162.1 |
| 8,456,808 B2* | 6/2013 | Grey | F16M 11/10 | 248/201 |
| 8,517,322 B2* | 8/2013 | Lam | F16M 11/10 | 248/292.14 |
| 8,925,877 B2* | 1/2015 | Carnevali | B60R 11/0252 | 248/122.1 |
| 9,140,406 B2* | 9/2015 | Simon | F16M 13/022 | |
| 9,810,973 B2* | 11/2017 | Elmohtaseb | F16M 11/2021 | |
| 9,890,899 B2* | 2/2018 | Theis | F16M 11/041 | |
| 10,018,299 B2* | 7/2018 | Feldman | F16M 13/02 | |
| 10,024,484 B2* | 7/2018 | Brown | F16M 11/041 | |
| RE47,043 E* | 9/2018 | Graham | F16M 11/18 | |
| 2007/0262215 A1* | 11/2007 | Tan | F16M 11/10 | 248/201 |
| 2010/0038501 A1* | 2/2010 | Oh | F16M 11/10 | 248/201 |
| 2011/0011996 A1* | 1/2011 | Cheng | F16M 11/041 | 248/216.4 |

\* cited by examiner

ADJUSTABLE TELEVISION FIXING BRACKET

TECHNICAL FIELD

The present disclosure relates to technical fields of television fixing fittings, and in particular relates to a bracket for fixing a television, of course, it can also be used to mount a display, the bracket is generally used in cooperation with a device having a standard socket such as a car or the like.

BACKGROUND

With the improvement of living standards and the full promotion of flat panel televisions, nowadays, people not only want to place the televisions on fixed places, such as, homes, offices, and the like, but also hope to watch televisions on some movable facilities, such as pick up trucks, motor homes, sports utility vehicles (SUV), vehicles and other types of cars. This type of car is generally equipped with standard mounting holes at a back thereof to dock with a television bracket, which will bring greater pleasure and convenience to people when they travel. A traditional way to mount a flat panel television on a car is to mount the television bracket through screws, or weld the television bracket, and then mount the television on the television bracket. The disadvantages of the traditional way is that the structure of the television bracket is fixed. After the television is mounted on the television bracket, the posture of the television is fixed, and it is impossible to adjust an orientation and a tilt angle of the television according to actual viewing requirements. Some television brackets that can be adjusted have disadvantages of complicated structure, single adjustment way (usually only left and right rotation adjustment), and small adjustment range, which restricts its popularization and application.

SUMMARY

The present disclosure aims to cure the defects of the prior art and provides an adjustable television fixing bracket with more reasonable structure design, more convenient adjustment operation, and simultaneous adjustment of angle and orientation.

To solve above technical problems, the present disclosure discloses an adjustable television fixing bracket. The adjustable television fixing bracket comprises a mounting member, fixing strips, a connecting standpipe, a connecting horizontal pipe, a supporting standpipe, and an adjusting pipe. The fixing strips define engaging holes. The engaging holes of the fixing strips engage with the mounting member to form a fixed structure. The mounting member is mounted to the connecting standpipe through an adjustable mechanism to form an adjustable structure which can tilt front and rear. The connecting standpipe is mounted to the connecting horizontal pipe to form a rotatable structure. The connecting horizontal pipe is mounted to the supporting standpipe to form a rotatable structure. The supporting standpipe is mounted to the adjusting pipe through a quick release structure.

Furthermore, two ends of the connecting horizontal pipe are telescoping structures. The connecting standpipe is mounted to one telescoping structure which locates on one end of the connecting horizontal pipe through a horizontal pipe connecting sleeve, and further adopts a horizontal pipe adjusting handle to fix and form a 360 degree rotation adjusting structure. Another telescoping structure which locates on other end of the connecting horizontal pipe is mounted to an upper end of the supporting standpipe through another horizontal pipe connecting sleeve, and further adopts another horizontal pipe adjusting handle to fix and form a 360 degree rotation adjusting structure. When the horizontal pipe adjusting handle is released, the connecting standpipe or the connecting horizontal pipe can be rotated 360 degrees to adjust a viewing angle.

Furthermore, the adjustable mechanism comprises an adjustment base and a fixed base. The mounting member is fixed to the adjustment base through screws. The adjustment base is mounted to the fixed base. The adjustment base defines two tilting adjustment holes of curved strip structures at two sides of an upper end thereof. A bottom end of the adjustment base is fixed to the fixed base through tilting fixing screws. One side of the upper end of the adjustment base is coupled to the fixed base through tilting adjusting handles passing through the tilting adjustment holes, to form a structure which can obliquely rotate front and rear. An angle of rotating front and rear is ~15~+5 degrees. There is a spacer located between each tilting adjusting handle and the adjustment base. When the tilting adjusting handle is released, the mounting member can be adjusted up and down in a front-rear direction so that the television is tilted up or down to a certain angle.

Furthermore, a bottom end of the supporting standpipe is coupled to the adjusting pipe through a vertical sleeve. The supporting standpipe defines a plurality of height adjustment holes spaced from each other and arranged along an axial direction thereof. The adjusting pipe and the vertical sleeve each defines a through hole corresponding to the plurality of the height adjustment holes. The supporting standpipe forms a height adjustable structure through a bolt inserting into any one height adjustment hole and the through hole. Such that, the mounting height of the television can be adjusted. One side of front end of the bolt provides a curved convex anti-shedding point.

Furthermore, the mounting member is equipped with two fixing strips. A back of each fixing strip is provided with a screw fixing portion. A quick locking structure for a television is formed by screwing a fixed screw into the screw fixing portion.

Furthermore, the mounting member is perpendicular to the connecting standpipe. The connecting standpipe is perpendicular to the connecting horizontal pipe. The connecting horizontal pipe is perpendicular to the supporting standpipe. Moreover, an extension tube may also be provided. The adjustment pipe and the extension tube each defines a pin hole. After the adjustment pipe is inserted into the extension tube, the extension tube is coupled with the adjustment pipe through a bolt inserting into the pin holes, which is suitable for an opening state of a tailgate of the pickup truck and other similar occasions to use.

Furthermore, a rear end of the extension tube has an extension docking portion that can be cascaded with another extension tube. The extension docking portion also has a pin hole, which can be re-lengthened.

In present disclosure, the television (or the display) can be tilted upwards, downwards, rotated left or right, and raised or lowered height by the mutual cooperation of the mounting member, the adjustment base, the fixed base, the connecting standpipe, the connecting horizontal pipe, the supporting standpipe, and the adjusting pipe, so that it can be flexibly adjusted according to actual observation needs of users, which improves its adaptability, and can be widely used in pick up trucks, motor homes, SUV, vehicles and and other types of cars. At the same time, the television is mounted in a quick-mounted structure, which is more convenient to operate.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely some embodiments of the present disclosure, those of ordinary skilled in the art may also obtain other drawings based on these drawings without any creative efforts.

Figure 1:
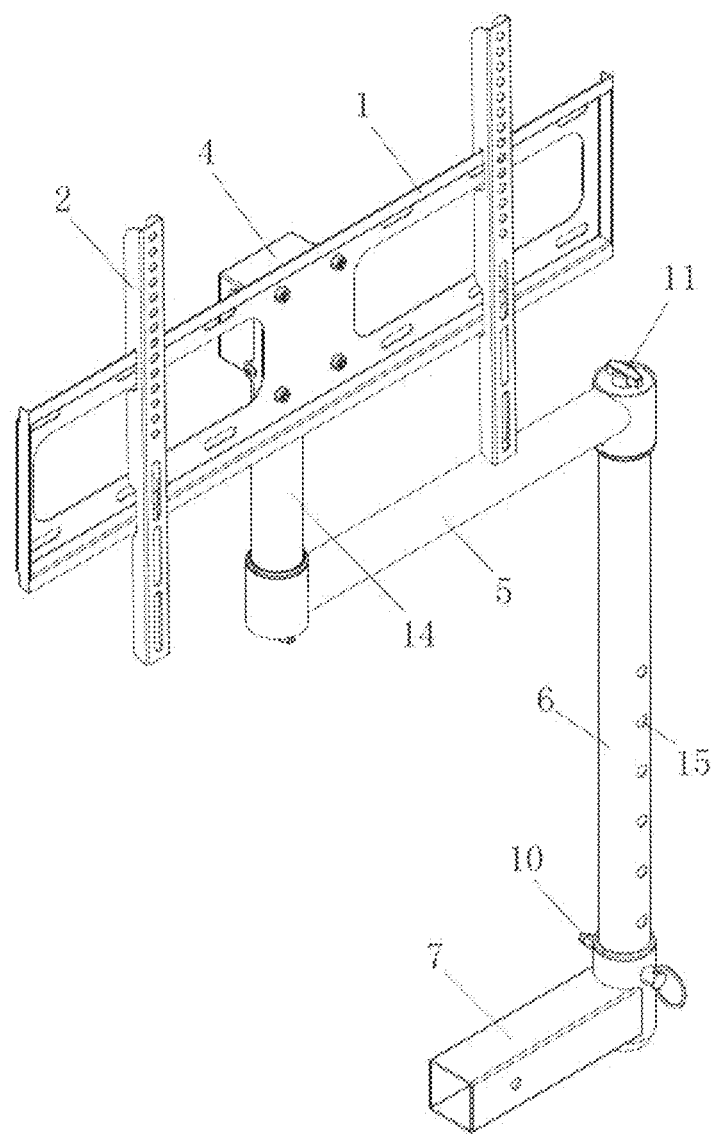
FIG. 1 is a diagram of a three-dimensional structure of an adjustable television fixing bracket in accordance with an embodiment of the present disclosure.
Figure 2:
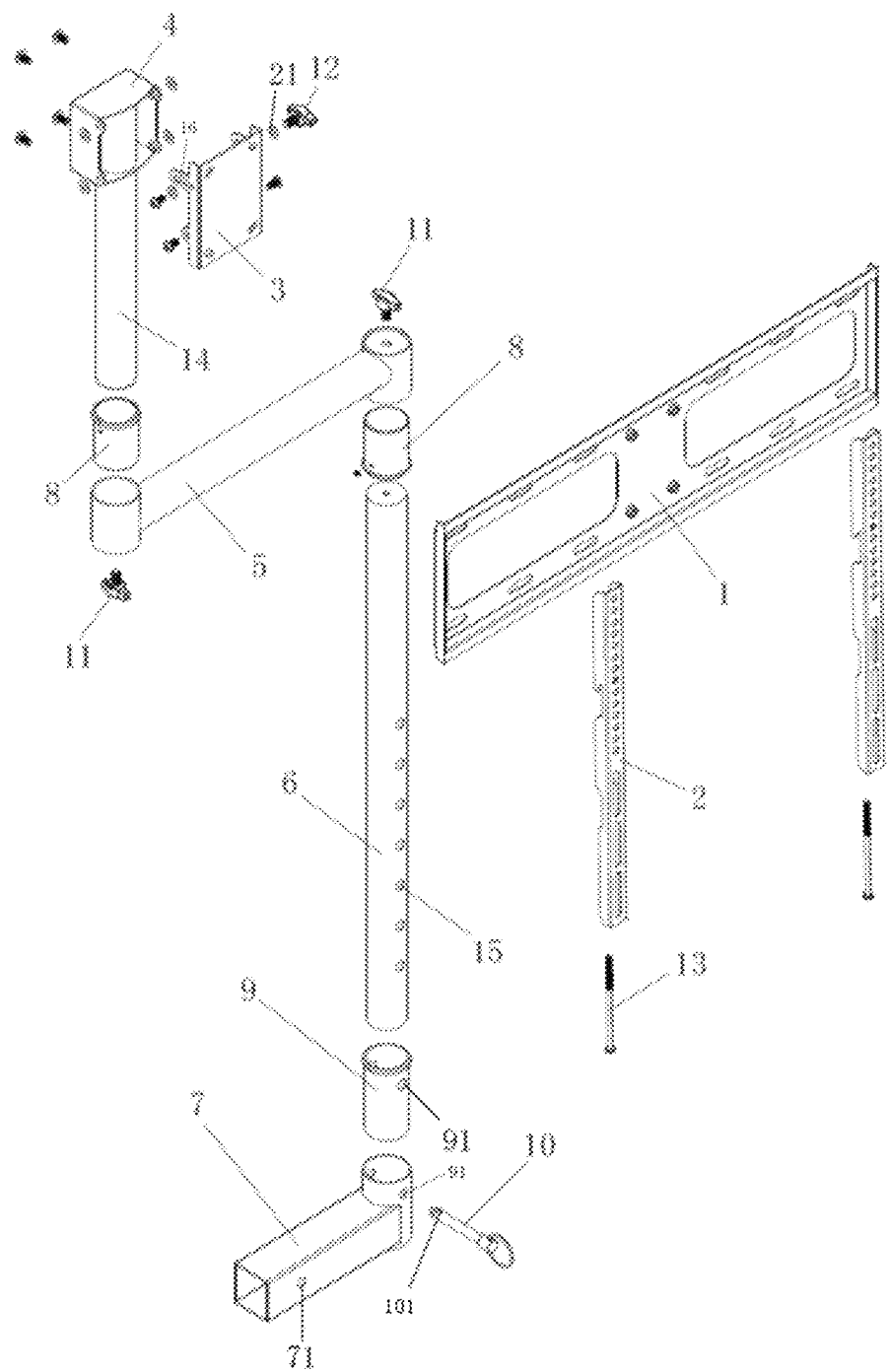
FIG. 2 is an exploded diagram of a three-dimensional structure of an adjustable television fixing bracket in accordance with an embodiment of the present disclosure.
Figure 3:
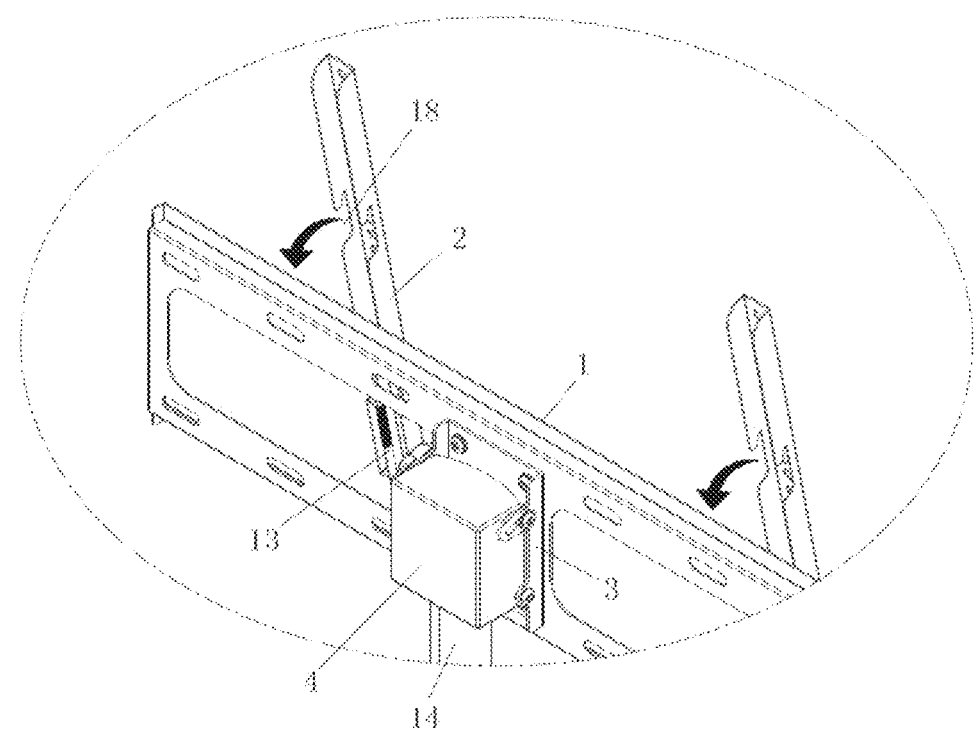
FIG. 3 is a diagram of a structure of fixing strips assembling with a wall plate in accordance with an embodiment of the present disclosure.
Figure 4:
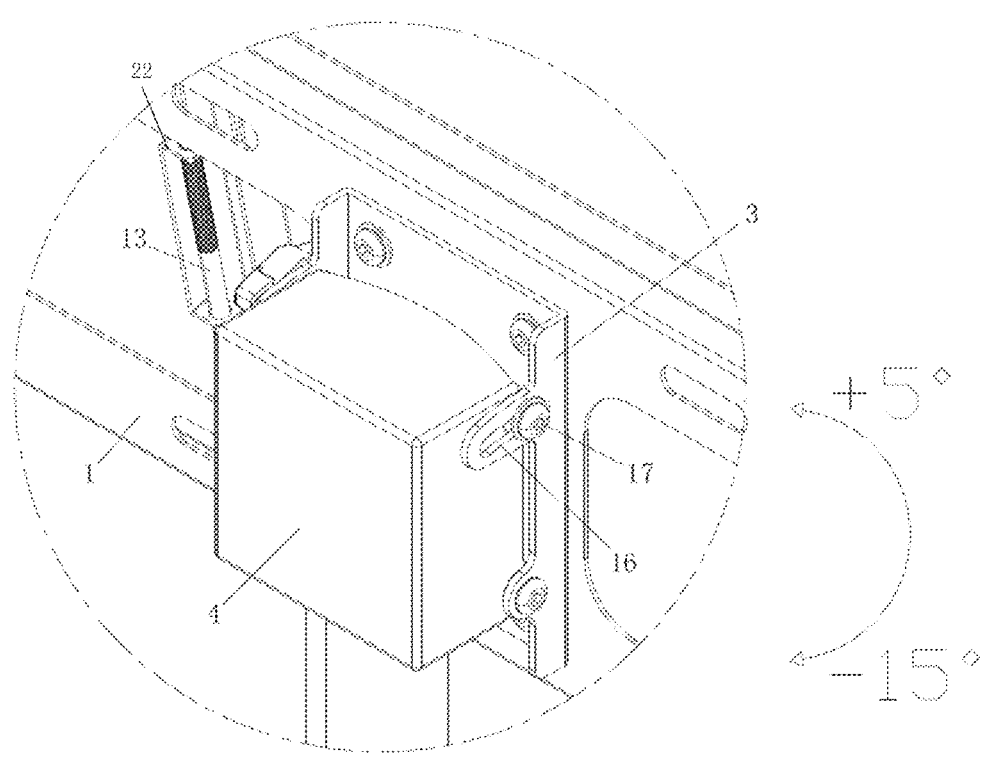
FIG. 4 is a diagram of a structure of an adjustment base assembling with a fixed base of in accordance with an embodiment of the present disclosure.
Figure 5:
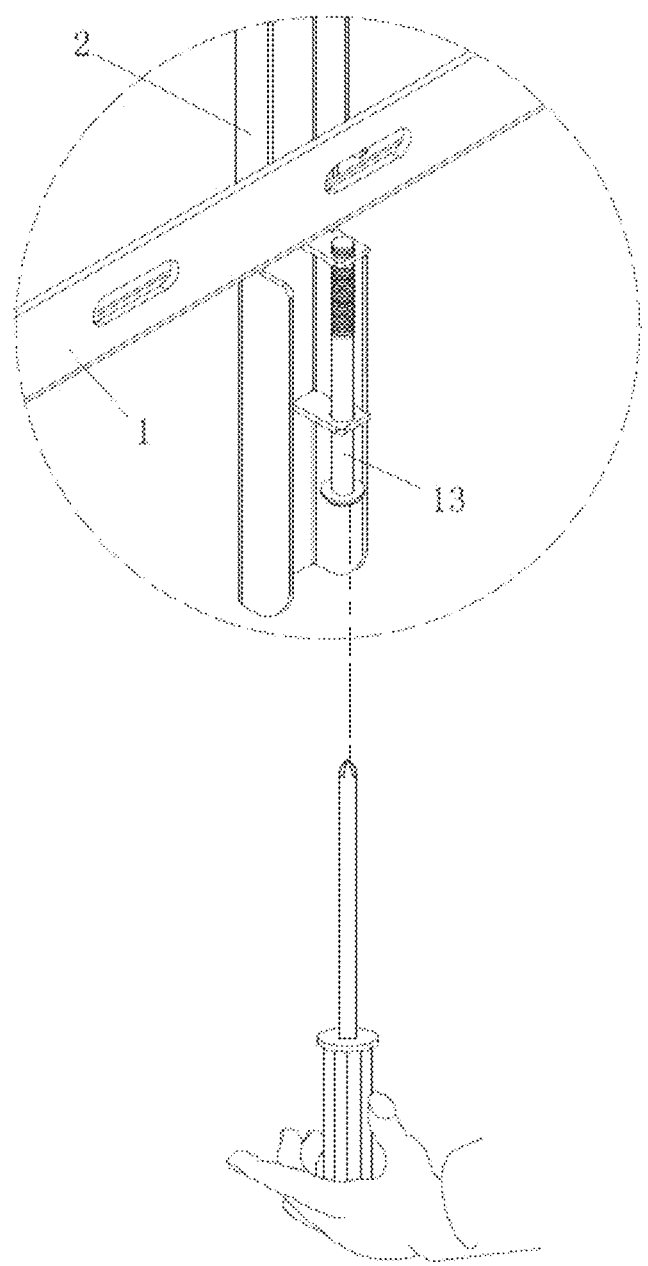
FIG. 5 is a diagram of a television mounting screw assembling with a fixing strip in accordance with an embodiment of the present disclosure.

In the figures, 1 represents a mounting member, 2 represents a fixing strip, 3 represents an adjustment base, 4 represents a fixed base, 5 represents a connecting horizontal pipe, 6 represents a supporting standpipe, 7 represents an adjusting pipe. 8 represents a horizontal pipe connecting sleeve, 9 represents a vertical sleeve. 10 represents a bolt, 11 represents a horizontal pipe adjusting handle, 12 represents a tilting adjusting handle, 13 represents a fixed screw, 14 represents a connecting standpipe, 15 represents a height adjustment hole, 16 represents a tilting adjustment hole, 17 represents a tilting fixing screw, 18 represents an engaging hole, 19 represents an extension tube, 20 represents an extension docking portion.

DETAILED DESCRIPTION OF ILLUSTRATED EMBODIMENTS

The technology solutions in the embodiments of the present disclosure will be described clearly and completely hereinafter with reference to the accompanying drawings in the embodiments of the present disclosure. Obviously, the described embodiments are merely some but not all embodiments of the present disclosure. All other embodiments obtained by a person of ordinary skilled in the art based on the embodiments of the present disclosure without creative efforts shall fall within the protection scope of the present disclosure.

Referring to FIGS. 1 to 5, in this embodiment, an adjustable television fixing bracket comprises a mounting member 1, fixing strips 2, a connecting standpipe 14, a connecting horizontal pipe 5, a supporting standpipe 6, and an adjusting pipe 7. The fixing strips 2 define engaging holes 18. The engaging holes 18 of the fixing strips 2 engage with the mounting member 1 to form a fixed structure. The mounting member 1 is mounted to the connecting standpipe 14 through an adjustable mechanism to form an adjustable structure which can tilt front and rear. The connecting standpipe 14 is mounted to the connecting horizontal pipe 5 to form a rotatable structure. The connecting horizontal pipe 5 is mounted to the supporting standpipe 6 to form a rotatable structure. The supporting standpipe 6 is mounted to the adjusting pipe 7 through a quick release structure.

Two ends of the connecting horizontal pipe 5 are telescoping structures. The connecting standpipe 14 is mounted to one telescoping structure which locates on one end of the connecting horizontal pipe 5 through a horizontal pipe connecting sleeve 8, and further adopts a horizontal pipe adjusting handle 11 to fix and form a 360 degree rotation adjusting structure. Therein, the 360 degree rotation is a rotation about a center axis of the horizontal pipe connecting sleeve 8 at 360 degree. Another telescoping structure which locates on other end of the connecting horizontal pipe 5 is mounted to an upper end of the supporting standpipe 6 through another horizontal pipe connecting sleeve 8, and further adopts another horizontal pipe adjusting handle 11 to fix and form a 360 degree rotation adjusting structure. When the horizontal pipe adjusting handle 11 is released, the connecting standpipe 14 or the connecting horizontal pipe 5 can be rotated 360 degrees to adjust the viewing angle.

The adjustable mechanism comprises an adjustment base 3 and a fixed base 4. The mounting member 1 is fixed to the adjustment base 3 through screws. The adjustment base 3 is mounted to the fixed base 4. The adjustment base 3 defines two tilting adjustment holes 16 of curved strip structures at two sides of an upper end thereof. A bottom end of the adjustment base 7 is fixed to the fixed base 4 through tilting fixing screws 17. One side of the upper end of the adjustment base 3 is coupled to the fixed base 4 through tilting adjusting handles 12 passing through the tilting adjustment holes 16, to form a structure which can obliquely rotate front and rear. An angle of rotating front and rear is −15~+5 degrees. There is a spacer 21 located between each tilting adjusting handle 12 and the adjustment base 3. The spacer 21 can be made of iron and/or other materials. When the tilting adjusting handle 12 is released, the mounting member 1 can be adjusted up and down in a front-rear direction so that the television is tilted up or down to a certain angle.

A bottom end of the supporting standpipe 6 is coupled to the adjusting pipe 7 through a vertical sleeve 9. The supporting standpipe 6 defines a plurality of height adjustment holes 15 spaced from each other and arranged along an axial direction thereof. The adjusting pipe 7 and the vertical sleeve 9 each defines a through hole 91 corresponding to the plurality of the height adjustment holes 15. The supporting standpipe 6 forms a height adjustable structure through a bolt 10 inserting into any one height adjustment hole 15 and the through hole 91. Such that, the mounting height of the television can be adjusted. One side of front end of the bolt 10 provides a curved convex anti-shedding point 101.

The mounting member 1 is equipped with two fixing strips 2. The back of each fixing strip 2 is provided with a screw fixing portion 22. A quick locking structure for a television is formed by screwing a fixed screw 13 into the screw fixing portion 22.

The mounting member 1 is perpendicular to the connecting standpipe 14. The connecting standpipe 14 is perpendicular to the connecting horizontal pipe 5. The connecting horizontal pipe 5 is perpendicular to the supporting standpipe 6.

Figure 6:
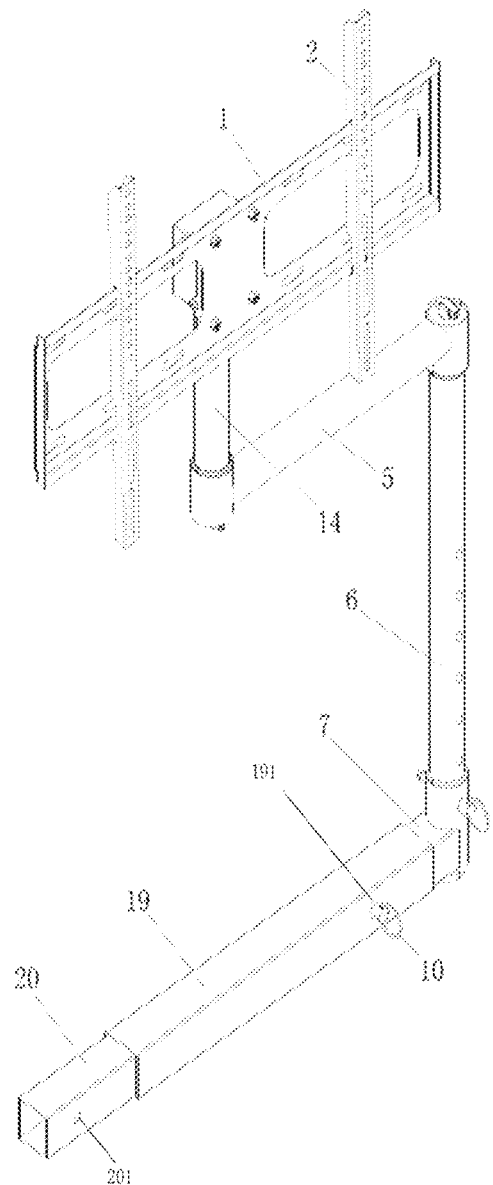
FIG. 6 is a diagram of the adjustable television fixing bracket after mounting an extension tube in accordance with an embodiment of the present disclosure.

Referring to FIG. 6, an extension tube 19 may also be provided. The adjustment pipe 7 and the extension tube 19 defines pin holes 71, 191 respectively. After the adjustment pipe 7 is inserted into the extension tube 19, the extension tube 19 is coupled with the adjustment pipe 7 through a bolt 10 inserting into the pin holes 71, 191, which is suitable for an opening state of a tailgate of the pickup truck and other similar occasions to use.

A rear end of the extension tube 19 has an extension docking portion 20 that can be cascaded with another extension tube. The extension docking portion 20 also has a pin hole 201, which can be used for re-lengthened.

In present disclosure, the television (or the display) can be tilted upwards, downwards, rotated left or right, and raised or lowered height by the mutual cooperation of the mounting member, the adjustment base, the fixed base, the connecting standpipe, the connecting horizontal pipe, the supporting standpipe, and the adjusting pipe, so that it can be flexibly adjusted according to actual observation needs of users, which improves its adaptability, and can be widely used in pick up trucks, motor homes, SUV, vehicles and other types of cars. At the same time, the television is mounted in a quick-mounted structure, which is more convenient to operate.

The above are some embodiments of the present disclosure, and it should be noted that those skilled in the art may make some improvements and modifications without departing from the principle of the present disclosure, and these improvements and modifications are also the protection scope of the present disclosure.

What is claimed is:

1. An adjustable television fixing bracket, wherein, the adjustable television fixing bracket comprises a mounting member, fixing strips, a connecting standpipe, a connecting horizontal pipe, a supporting standpipe, and an adjusting pipe, the fixing strips define engaging holes, the engaging holes of the fixing strips engage with the mounting member to form a fixed structure, the mounting member is mounted to the connecting standpipe through an adjustable mechanism to form an adjustable structure which can tilt front and rear, the connecting standpipe is mounted to the connecting horizontal pipe to form a rotatable structure, the connecting horizontal pipe is mounted to the supporting standpipe to form a rotatable structure, the supporting standpipe is mounted to the adjusting pipe through a quick release structure; wherein, two ends of the connecting horizontal pipe are telescoping structures, the telescoping structure which locates on one end of the connecting horizontal pipe is mounted to an upper end of the supporting standpipe through one horizontal pipe connecting sleeve, and further adopts one horizontal pipe adjusting handle to fix and form a 360 degree rotation adjusting structure.

2. The adjustable television fixing bracket according to claim 1, wherein, the connecting standpipe is mounted to another telescoping structure which locates on another end of the connecting horizontal pipe through another horizontal pipe connecting sleeve, and further adopts another horizontal pipe adjusting handle to fix and form a 360 degree rotation adjusting structure.

3. The adjustable television fixing bracket according to claim 1, wherein, the adjustable mechanism comprises an adjustment base and a fixed base, the mounting member is fixed to the adjustment base through screws, the adjustment base is mounted to the fixed base, the adjustment base defines two tilting adjustment holes of curved strip structures at two sides of an upper end thereof, a bottom end of the adjustment base is fixed to the fixed base through tilting fixing screws, one side of the upper end of the adjustment base is coupled to the fixed base through tilting adjusting handles passing through the tilting adjustment holes, to form a structure which can obliquely rotate front and rear.

4. The adjustable television fixing bracket according to claim 3, wherein, an angle of rotating front and rear is =15~+5 degrees.

5. The adjustable television fixing bracket according to claim 3, wherein, there is a spacer located between each tilting adjusting handle and the adjustment base.

6. The adjustable television fixing bracket according to claim 3, wherein, when the tilting adjusting handle is released, the mounting member can be adjusted up and down in a front-rear direction so that the television is tilted up or down to a certain angle.

7. The adjustable television fixing bracket according to claim 1, wherein, a bottom end of the supporting standpipe is coupled to the adjusting pipe through a vertical sleeve, the supporting standpipe defines a plurality of height adjustment holes spaced from each other and arranged along an axial direction thereof, the adjusting pipe and the vertical sleeve each defines a through hole corresponding to the plurality of the height adjustment holes, the supporting standpipe forms a height adjustable structure through a bolt inserting into any one height adjustment hole and the through holes.

8. The adjustable television fixing bracket according to claim 7, wherein, one side of front end of the bolt provides a curved convex anti-shedding point.

9. The adjustable television fixing bracket according to claim 7, wherein, the mounting member is equipped with two fixing strips, a back of the fixing strip is provided with a screw fixing portion, a quick locking structure for a television is formed by screwing a fixed screw into the screw fixing portion.

10. The adjustable television fixing bracket according to claim 1, wherein, the mounting member is perpendicular to the connecting standpipe, the connecting standpipe is perpendicular to the connecting horizontal pipe, the connecting horizontal pipe is perpendicular to the supporting standpipe.

11. The adjustable television fixing bracket according to claim 1, wherein, the adjustable television fixing bracket further comprises an extension tube, the adjusting pipe and the extension tube define pin holes respectively, after the adjusting pipe is inserted into the extension tube, the extension tube is coupled with the adjusting pipe through a bolt inserting into the pin holes.

12. The adjustable television fixing bracket according to claim 11, wherein, a rear end of the extension tube has an extension docking portion that can be cascaded with another extension tube, the extension docking portion also has a pin hole, which can be re-lengthened.

13. An adjustable television fixing bracket, wherein, the adjustable television fixing bracket comprises a mounting member, fixing strips, a connecting standpipe, a connecting horizontal pipe, a supporting standpipe, and an adjusting pipe, the fixing strips define engaging holes; wherein, the engaging holes of the fixing strips engage with the mounting member to form a fixed structure; the mounting member is mounted to the connecting standpipe through an adjustable mechanism to form an adjustable structure which can tilt front and rear; the connecting standpipe is mounted to the connecting horizontal pipe to form a rotatable structure; the connecting horizontal pipe is mounted to the supporting standpipe to form a rotatable structure; the supporting standpipe is mounted to the adjusting pipe through a quick release structure; the adjustable mechanism comprises an adjustment base and a fixed base; the mounting member is fixed to the adjustment base through screws; the adjustment base is mounted to the fixed base; the adjustment base defines two tilting adjustment holes of curved strip structures at two sides of an upper end thereof; a bottom end of the adjustment base is fixed to the fixed base through tilting fixing screws; one side of the upper end of the adjustment base is coupled to the fixed base through tilting adjusting handles passing through the tilting adjustment holes, to form a structure which can obliquely rotate front and rear.

14. The adjustable television fixing bracket according to claim 13, wherein, an angle of rotating front and rear is −15~+5 degrees.

15. The adjustable television fixing bracket according to claim 13, wherein, there is a spacer located between each tilting adjusting handle and the adjustment base.

16. An adjustable television fixing bracket, wherein, the adjustable television fixing bracket comprises a mounting member, fixing strips, a connecting standpipe, a connecting horizontal pipe, a supporting standpipe, and an adjusting pipe, the fixing strips define engaging holes; wherein, the engaging holes of the fixing strips engage with the mounting member to form a fixed structure; the mounting member is mounted to the connecting standpipe through an adjustable mechanism to form an adjustable structure which can tilt front and rear; the connecting standpipe is mounted to the connecting horizontal pipe to form a rotatable structure; the connecting horizontal pipe is mounted to the supporting standpipe to form a rotatable structure; the supporting standpipe is mounted to the adjusting pipe through a quick release structure; wherein, the adjustable television fixing bracket further comprises an extension tube, the adjusting pipe and the extension tube define pin holes respectively, after the adjusting pipe is inserted into the extension tube, the extension tube is coupled with the adjusting pipe through a bolt inserting into the pin holes.

17. The adjustable television fixing bracket according to claim 16, wherein, a rear end of the extension tube has an extension docking portion that can be cascaded with another extension tube, the extension docking portion also has a pin hole, which can be re-lengthened.

* * * * *